United States Patent Office 3,261,272
Patented July 19, 1966

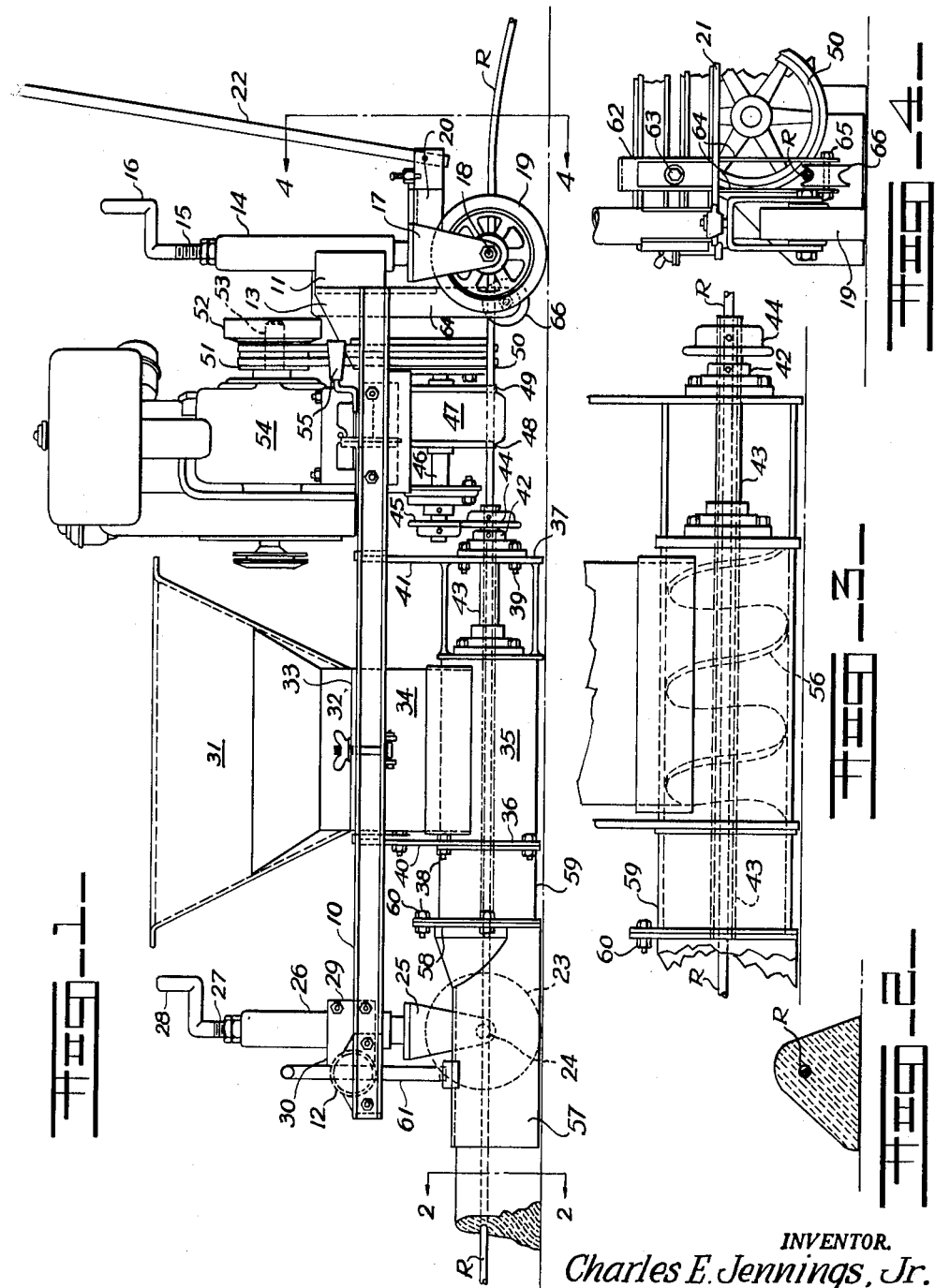

3,261,272
CURB FORMING MACHINE
Charles E. Jennings, Jr., Youngstown, Ohio, assignor to
The Renner Company, Youngstown, Ohio, a corporation of Ohio
Continuation of application Ser. No. 56,413, Sept. 6, 1960.
This application June 11, 1963, Ser. No. 288,071
1 Claim. (Cl. 94—46)

This application is a continuation of my co-pending application for a Curb Forming Machine, Ser. No. 56,413, filed September 6, 1960, now abandoned, and the latter application comprises an improvement over the invention disclosed in my co-pending application Ser. No. 792,781 for a Curb Forming Machine filed on February 12, 1959, and now Patent No. 3,053,156.

This invention relates to a curb forming machine and more particularly to a machine which will extrude curbing formed of Portland cement, concrete or bituminous concrete and simultaneously position a reinforcing rod therein.

The principal object of this invention is to provide a curb forming machine that receives Portland cement concrete, or bituminous concrete, compacts the concrete and extrudes it through a form of a desired shape and simultaneously positions the extruded material on a surface and installs a reinforcing rod axially within the extruded material so as to produce a reinforced formed curbing.

Another object of this invention is the provision of a curb forming machine in which a portion of the means for compacting the concrete is tubular and capable of passing a reinforcing rod longitudinally therethrough so as to position the same within the curbing formed by the machine.

It is yet another object of the invention to provide a curb forming machine for producing reinforced curbing which includes a compaction screw rotatably mounted on and driven by a hollow drive shaft which performs a dual function, namely, the hollow drive shaft supports and rotates the compaction screw, and also serves as a means for rigidly supporting an elongated flexible reinforcing rod and as a means for inserting the rod into the curbing formed by the machine.

It is still another object of the invention to provide a machine for forming reinforced curbing which is provided with means for supporting the reinforcing material after it is installed within the newly formed curbing.

More specifically, it is another object of the invention to provide a machine for forming reinforced curbing which is provided with an elongated hollow drive shaft and pulley means aligned therewith for effectively supporting elongated flexible reinforcing rods.

A still further object of the invention is to provide a novel compaction chamber and forming nozzle and means for supporting same on a curb forming machine.

When a curbing is formed and installed on a supporting surface, the bottom of the curbing is secured to the surface and reinforced thereby. However, the top of the curbing which projects above the supporting surface is normally not reinforced and is exposed so that it may be easily damaged. Accordingly, it is another object of this invention to provide a machine which not only produces a reinforced curbing, but installs the reinforcing material in the upper portion of the curbing where it will more effectively serve its reinforcing function.

It is still yet another object of the invention to provide a curb forming machine that is simple in construction and operation and which may be used for placing curbing in various localities on various grades and providing for the reinforcement of the curbing simultaneously with the formation thereof.

The curb forming machine disclosed in said patent comprises a machine in which parts may be easily exchanged so as to extrude curbing material from either the right or the left side thereof, and which machine is free from vibration and therefore capable of extruding a perfectly shaped curb.

The machine in my prior Patent No. 3,053,156 incorporates sidewardly adjustable wheel assemblies on both the front and rear ends thereof to facilitate positioning the wheels to avoid an asphalt tack coating frequently used on pavements to assure adhesion of an extruded bituminous concrete curb. The present invention relates generally to the same machine disclosed in said patent with the major exception that the present machine is so formed as to be able to receive a reinforcing rod of ½" diameter and pass it through the compacting and shaping portions of the machine axially thereof so as to position the reinforcing rod axially through the curbing being formed by the machine.

Those skilled in the art will be familiar with the fact that reinforced concrete comprises a considerably stronger material than non-reinforced concrete and that this fact is of considerable importance in the formation of concrete structures. Heretofore, the machines in the art capable of extruding concrete curbing have been incapable of incorporating any reinforcing means in the curbing being formed with the result that the completed curbing lacks the strength and the ability to withstand shock and strain. Curbing formed of extruded bituminous concrete is even more susceptible to damage from shock or strain than curbing formed of Portland cement concrete and the curbing machines heretofore known in the art and capable of extruding bituminous concrete curbing have not provided for the placement of reinforcing members therein. It will be obvious to those skilled in the use of bituminous concrete that reinforcing members have not been used with this material.

It has been determined that an extruded bituminous concrete curb incorporating a reinforcing member such as longitudinally extending axially positioned steel rod will withstand many times the shock and strain of a bituminous curb without such reinforcing and the present invention relates to a machine which will place such a reinforcing rod in either Portland cement concrete or bituminous concrete being extruded and shaped into a curb.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIG. 1 is a side elevation of the curb forming machine showing a portion of curb formed thereby;

FIG. 2 is a vertical cross sectional view taken substantially on the line 2—2 of FIG. 1;

FIG. 3 is an enlarged detail of a lower portion of the curb forming machine shown in FIG. 1;

FIG. 4 is a partial end elevation taken on line 4—4 of FIG. 1.

By referring to the drawings, and FIG. 1 in particular, it will be seen that the curb forming machine includes a rectangular frame having side rails 10, transversely extending and vertically spaced front frame members 11, 11 which are U-shaped or channel shaped in cross section, and a transversely extending tubular rear frame member 12. Triangular bracket members 13 are secured to the upper surfaces of the forward ends of side rails 10. The ends of frame members 11 overlap the forward vertical faces of the brackets 13 and frame members 11 and are clamped thereto by vertical channel members 62 and bolts 63. By loosening the bolts 63, the frame member 11 may be adjusted laterally. A cylindrical member 14 is secured to each pair of adjacent ends of the frame members 11. Threaded rods 15 are provided so as to extend through the cylinders 14. The threaded rods 15 are provided with cranks 16 on their uppermost ends and the lower ends of each of the threaded rods 15 engages a telescopically mounted bifurcated section 17 which extends below the lowermost end of the cylinder members 14 and carries a axle 18 on which is rotatably mounted a ground engaging wheel 19.

Each of the bifurcated lower sections 17 has a forwardly projecting portion 20, and the projecting portions 20 are connected together by a tie rod 21 so that steering motion imparted to one will be carried to the other. Each of the forwardly projecting portions 20 is bifurcated and adapted to receive in a detachable manner a pivoted handle 22, only one of which is necessary.

The rear end of the machine having the transverse tubular rear frame member 12 is supported on a pair of ground engaging wheels 23, 23 which are positioned on an axle 24 which in turn is carried on a bifurcated telescopically mounted member 25 positioned in a cylindrical member 26 and adjustable vertically by means of a threaded shaft 27 having a crank 28 formed on its uppermost end. The cylindrical member 26 is secured to a bracket 29 attached by way of an offset portion 30 through the transverse tubular rear frame member 12.

The rear half of the frame 10 has hopper receiving sections for supporting a hopper 31 which is held in position thereon by a pair of fasteners 32 which are attached to the side rails 10 and which fasteners 32 engage brackets 33 on the opposite sides of the hopper 31.

The hopper has a bottom 34 which runs sidewardly and downwardly to a discharge opening communicating with a compaction screw housing 35 which in turn is provided with flanged end portions 36 and 37 which in turn are attached by fasteners 38 and 39 to transverse frame members 40 and 41 intermediate the ends of the rectagular frame of the curb forming machine and below the rectangular frame.

The forward flanged end portion 37 carries a journal 42 through which a hollow drive tube 43 is positioned. A sprocket 44 is positioned on the drive tube 43 and a chain (not shown) connects the sprocket 44 with a secondary sprocket 45 which is positioned on a drive shaft 46 which in turn is part of a gear box 27 mounted below and between a pair of transverse frame members 48 and 49 secured to the side rails 10 of the machine.

Sheaves 50 on the drive shaft of the gear box 47 are vertically aligned with sheaves 51 on a centrifugal clutch mechanism 52 which is mounted on a drive shaft 53 of an internal combustion engine 54 which is also carried on the transverse frame members 48 heretofore referred to.

The gear box 47 is provided with a safety throw-out lever 55. The drive tube 43 heretofore referred has an axial extension with a compaction screw 56 formed thereabout and which extends beyond the compaction screw 56 as best illustrated in FIGURE 3 of the drawings. The hollow drive tube 43 forms an axial passageway through the compaction screw 56 and the compaction chamber immediately behind the same, to the left as seen in FIGURES 1 and 3 of the drawings, and a reinforcing rod R positioned in the drive tube 43 can thus move axially through the compaction screw 56, the compaction chamber, and into the forming chamber 57. The forming chamber 57 which may be of any desired shape is secured at a flanged end 58 thereof to the compaction chamber 59 by fasteners 60. The forming chamber 57 is engaged by an adjustable support 61 which also engages the transverse tubular rear frame 12 and which support is adjustable relative thereto.

The bore through the drive tube or shaft 43 is of constant diameter and only slightly larger in diameter than the diameter of the rod R so that the rod has a snug sliding fit therein. The drive tube is elongated by extending forwardly and rearwardly of the screw 56 so as to support a substantial length of the rod R.

A pair of parallel and vertically extending arms 64 are secured at their upper ends to the clamping plate or channel member 62. An axle comprising a bolt 65 extends through the lower ends of the arms 64 and rotatably supports thereon a pulley 66 having an annular groove formed in its periphery which is semi-circular in cross section. The pulley 66 is arranged so that its upper curved surface is in substantial axial alignment with the axis of the drive tube 43, and is thereby in a position to support and guide the reinforcing rod R.

As shown in FIG. 1, the upper forward portion of the forming chamber or housing 57 is canted or flared upwardly and forwardly so as to be in alignment with the upper rear portion of the compaction chamber or housing 59 since the compaction housing is at a higher elevation than the forming chamber.

In operation, engine 54 rotates drive tube 43 which, in turn, rotates screw 56. A concrete or bituminous mixture is fed from the hopper 51 into the screw chamber 35 whereupon the rotating screw forces the mixture and compacts it within the compaction chamber 59. A reinforcing rod R is inserted through the drive tube 43 so that its forward end is supported on pulley 66 and the rear end of the rod extends into the forming chamber 57. The bituminous or concrete mixture is forced from the compaction chamber into the forming chamber 57 whereby it is compacted and formed into a curb such as illustrated in FIG. 2. The bituminous or concrete mixture is compressed by the inclined forward end of the forming chamber or housing 59 about the reinforcing rod, thereby closing the space left by tube 43. The curbing material adheres to a fixed surface such as a roadway and surrounds the reinforcing rod R so as to prevent it from moving with the curb forming machine. As the curb forming machine advances forwardly, to the right as viewed in FIGURE 1, it forms a continuous ribbon of curbing around the rod R which remains stationary and the curbing machine moves relative thereto while the rod slides through the rotating drive tube 33. Since the rod R fits snugly within the bore through the drive tube 43, the ends of the rod are supported as a cantilever. This prevents that portion of the rod immediately adjacent the rear of the machine from being forced by gravity downwardly through the relatively soft newly formed curbing. After the machine has moved a considerable distance from a portion of recently formed curbing, the curbing hardens sufficiently to support that portion of the rod R which it contains. Since the forming chamber 57 is located below the compaction chamber 59 and since the drive tube 43 is coaxial with the compaction chamber, the reinforcing rod R is placed within the upper portion of the curbing so as to provide reinforcement at the point where it is needed most. The pulley 66 rotatably supports the forward end of the reinforcing rod and rotates while the curb forming machine is in operation.

During operation of the curb forming machine, the drive shaft 43 performs a dual function in that it not only rotatably drives the screw 56 while supporting the screw, but also acts as a support and guide for the reinforcing rod R.

The path of movement of the reinforcing rod R is between the front wheels 19 and adjacent the inside of one of the wheels so that it passes to one side of the sheaves 50 and thereby enters the drive tube 43 on a substantially straight line. Successive lengths of reinforcing rod R may be continuously fed into the curb forming machine as it moves along in its curb forming operation.

It is to be noted that the forming chamber 57 is vertically supported by the adjustable support 61 so that the elevation of the forming chamber may be varied as desired. During operation of the machine, the bottom edges of the forming chamber or housing 57 is in contact with the surface on which the curbing is layed.

Inasmuch as various changes may be made in the form, location and relative arrangement of the several parts without departing from the essential characteristics of the invention, it will be understood that the invention is not to be limited except by the scope of the appended claim.

I claim:

A curb forming machine for forming a continuous, elongated, flat bottom curbing of plastic material with an elongated reinforcing rod in the center thereof and simultaneously placing said curbing and reinforcing rod on a supporting surface, said curb forming machine including a rectangular frame having a pair of laterally spaced longitudinally extending side rails which have front and rear ends, beam means extending between the front ends of said side rails and secured thereto, a hopper fixedly mounted on said side rails and having an upper portion projecting upwardly therefrom, a compaction housing having front and rear ends below said hopper and having an opening in the top thereof, said hopper having a lower portion communicating with the opening in said compaction housing, support means connecting said front and rear ends of said compaction housing to said rectangular frame, a curb forming housing having a curb forming chamber therein and front and rear ends in axial alignment with said compaction housing and the front end of said forming housing connected to the rear end of said compaction housing, adjustable means suspending said forming housing from said frame so that said forming housing may be adjusted vertically, said forming housing being of generally inverted U-shaped in cross section and open at its bottom, the top and bottom of said forming housing being parallel to but below the top and bottom respectively of said compaction housing, said forming housing having a top portion on its front end sloping upwardly to an upper corner of the rear end of said compaction housing, a drive tube journalled within said compaction housing and having a cylindrical bore therethrough, and a forward end portion of said drive tube projecting forwardly from said compaction housing, an auger formed around and fixed to said drive tube within said compaction housing and terminating in said housing at a location spaced forwardly of said forming housing, journal means on said frame spaced forwardly of said compaction housing and rotatably journalling said forward end portion of said drive tube, power means on said frame, the rear end of said drive tube terminating at the sloping front end of said forming housing, transmission means connected between said power means and the forward end of said drive tube, a front pair of wheels adjustably rotatably mounted on opposite ends of said beam means, a rear pair of wheels rotatably mounted on the rear of said frame, a roller rotatably mounted forward of said drive tube on said beam means between said wheels and having an axis transverse to the axis of said drive tube, the bore through said drive tube being tangent to the top of said roller, said bore being of constant cross sectional diameter, said wheels, frame and compact housing being so constructed and arranged that said drive tube is located at an elevation when used equal to the elevation at which a reinforcing rod is to be placed so that a reinforcing rod extending through said bore in said shaft and over said roller will be supported thereby and be prevented from bending the sloping top portion of said forming housing compacting the plastic material around the rod as the machine forms the continuous curbing.

References Cited by the Examiner
UNITED STATES PATENTS

| 2,123,989 | 7/1938  | Day       | 94—46 |
| 2,225,015 | 12/1940 | Lebelle   | 94—46 |
| 2,707,422 | 5/1955  | Canfield  | 94—39 |
| 2,945,278 | 7/1960  | Robertson. |       |
| 3,022,713 | 2/1962  | Friberg   | 94—39 |
| 3,053,156 | 11/1962 | Jennings  | 94—46 |

JACOB L. NACKENOFF, *Primary Examiner.*